United States Patent [19]
Ferguson

[11] Patent Number: 4,972,405
[45] Date of Patent: Nov. 20, 1990

[54] DATA PATH PROTECTION

[75] Inventor: Stephen P. Ferguson, Coventry, United Kingdom

[73] Assignee: GEC Plessey Telecommunications Limited, England

[21] Appl. No.: 364,256

[22] Filed: Jun. 9, 1989

[30] Foreign Application Priority Data

Jun. 13, 1988 [GB] United Kingdom ............... 8813958

[51] Int. Cl.$^5$ .................... H04J 1/16; G06F 11/00
[52] U.S. Cl. .................... 370/016; 371/008.2
[58] Field of Search .............. 370/16, 13, 14, 15; 371/4, 8.1, 8.2, 16.1, 36, 9

[56] References Cited

U.S. PATENT DOCUMENTS 4,562,575 12/1985 Townsend ............... 371/9
4,570,261 2/1986 Maher .................... 371/16

OTHER PUBLICATIONS

"A 1+1 Protected Digital Muldex for 3×45 Mb/s to 140 Mb/s Conversion", by J. Drupsteen, Philips Telecommunication Review, vol. 40, No. 3, Sep. 1982, pp. 183–192.

"TM 45/140 Interface Multiplexer for the European and American Standard Digital Hierarchies", by F. Ferret et al., in Commutation and Transmission, No. 3, 1985, pp. 29–34, & 36–38.

Primary Examiner—Douglas W. Olms
Assistant Examiner—Christopher O. Edwards
Attorney, Agent, or Firm—Kirschstein, Ottinger, Israel & Schiffmiller

[57] ABSTRACT

A transmission system in which a plurality of data streams are to be multiplexed and sent between receiving and transmitting equipment. At the transmit end the system comprises a plurality of worker tributary cards (51, 52) each having an input port (57) connected to an individual tributary to be sent to an associated multiplexer, and a stand-by tributary card (56) operative to replace a failed worker card. All the worker tributary cards (51–55) are interconnected by a common line (60) leading to the iput port (57) of the stand-by tributary card (56) but in normal operation being isolated from said line by a controllable unity-gain buffer 58. Each tributary to be transmitted is connected to an input port (57) of a worker tributary card and has a branch line which is connected to said common line (60) via the buffer (58) carried on another tributary card, detection of failure of a worker tributary causing the buffer (58) of the associated worker tributary card to be enabled to connect the tributary to said stand-by tributary card.

7 Claims, 4 Drawing Sheets

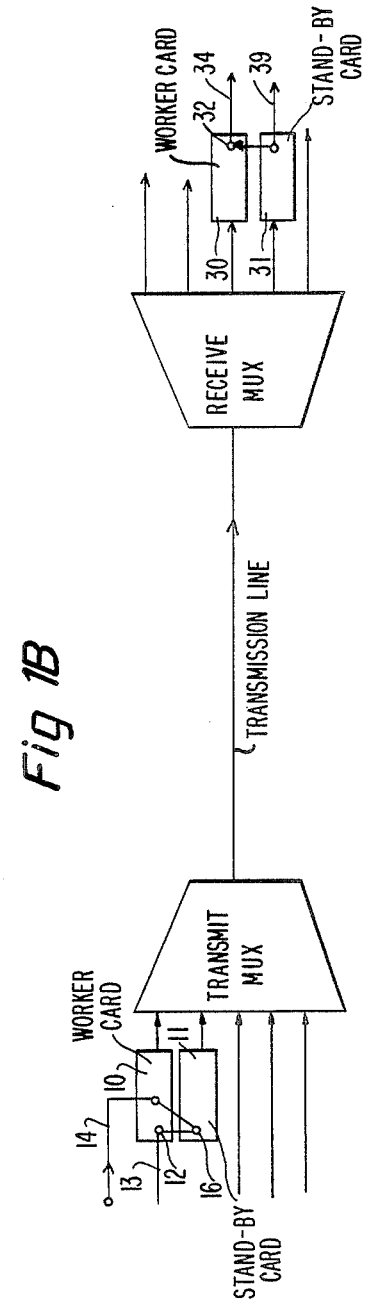

DATA PATH PROTECTION

BACKGROUND OF THE INVENTION

1. Field of the Invention

The present invention concerns the protection of traffic streams on duplicated transmission paths. It is particularly, though not exclusively, applicable to digital data.

2. Description of Related Art

A well known technique for providing protection of transmitted data is the "Twin-path" technique in which one identical signal is sent over two paths continuously. At the receiving point a changeover switch selects one of the two incoming signals. The selection is normally based on some kind of signal monitoring such as the detection of gross alarms or of degraded performance such as high error rate. In such a system the changeover switch is a common element in the transmission scheme no matter which path has been selected. It therefore has to be designed for a high degree of reliability and is accordingly expensive.

Another well-known technique is to use one spare path to support 1 of N working paths, with an N-way changeover switch being required at both transmitting and receiving points. Again this is expensive, particularly where N may be required to be large, for example, 14.

SUMMARY OF THE INVENTION

The present invention has for an object the elimination of the need for such changeover switches in data transmission systems using replicated transmission paths.

The present invention is described in what follows by reference to its use in a multiplexer, but similar arrangements would be used in line transmission terminals.

The tributary card referred to as the stand-by card may carry occasional traffic.

BRIEF DESCRIPTION OF THE DRAWINGS

In order that the present invention may be more readily understood, an embodiment thereof will now be described by way of example and with reference to the accompanying drawings, in which:

FIGS. 1A and 1B are block diagrams of a dual path data transmission system according to the present invention.

DETAILED DESCRIPTION OF THE PREFERRED EMBODIMENTS

Figure 1A:
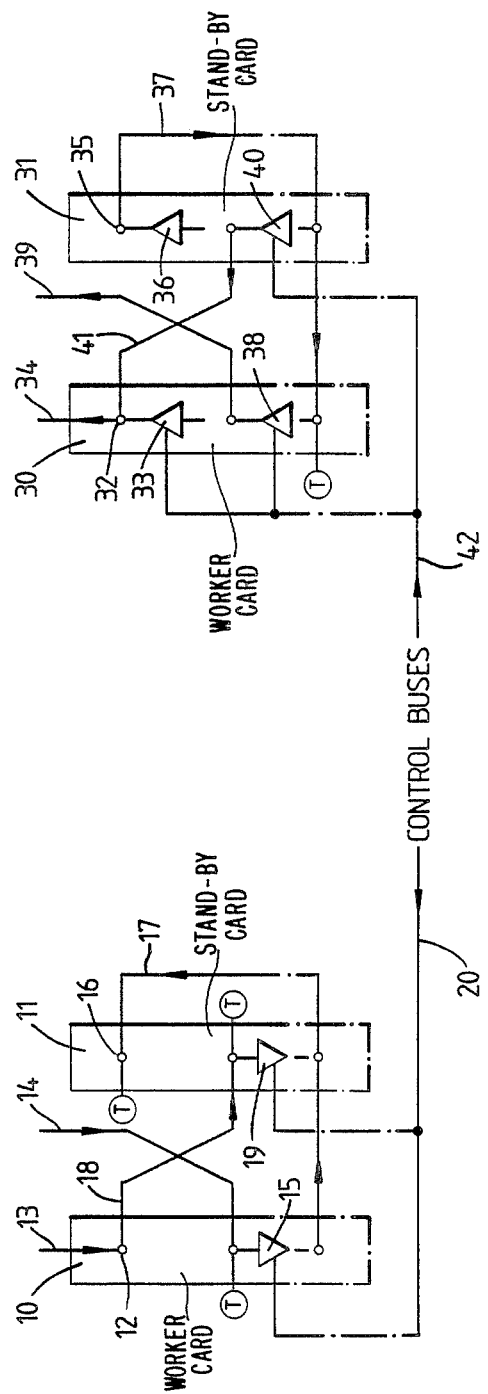

Referring now to FIGS. 1A and 1B of the accompanying drawings, this shows what is known as 1 for 1 dual path protection, but implemented in accordance with the present invention. The left hand side of FIGS. 1A and 1B shows the transmit end of the dual path transmission system consisting of a pair of tributary cards 10, 11 with card 10 being a main or worker card and card 11 a stand-by or protection card. Card 10 has an input port 12 connected to an input line 13 from a traffic source and in normal operation would pass the traffic on to a conventional transmit multiplexer MUX. Input line 14 carries occasional traffic which will be lost if path protection is needed. This occasional traffic is routed to the input port 16 of card 11 by a gateable unity gain buffer 15 carried by card 10 and the output of which is connected to the input port 16 of card 11 by a line 17. Input port 16 also transmits the traffic it receives to the MUX. The traffic on line 13 is branched at input port 12 and is also carried by a line 18 to controllable blocking means in the form of a unity gain buffer 19 on card 11. The buffers 15, 19 are controlled by a control bus 20. For the arrangement to function efficiently it is important that when OFF the buffers 15, 19 do not significantly load the highway to which they are connected. In normal operation buffer 15 is ON and transmits traffic from line 14 to input port 16 whilst buffer 19 is OFF and blocks the passage of the main traffic to input port 16.

Should now card 10 fail it means that only the branched traffic on line 18 is available for transmission to the MUX so that card 11 has to take over the functions necessary to enable the main traffic to be transmitted to the MUX. This inevitably means that the secondary or occasional traffic has to be blocked. In order to enable card 11 to take over the main worker function of card 10 buffer 15 is turned OFF by a signal on control bus 20 and buffer 19 is turned ON. The main traffic on line 13 is now connected via line 18, buffer 19 and line 17 to the input port 16 of card 11. The turning OFF of buffer 15 blocks the passage of the occasional traffic on line 14.

Referring now to the right hand side of FIGS. 1A and 1B this shows the corresponding receive end of the dual path transmission system. This receive end has two tributary cards 30, 31. Card 30 has an output port 32 associated with an output driver amplifier 33, port 32 being connected to an output line 34. Card 30 in normal operation handles the main traffic. Card 31 handles occasional traffic and has an output port 35 and associated output driver amplifier 36 connected to a line 37. Line 37 is connected to a gateable unity gain buffer 38 the output of which is connected to an output line 39 which in normal operation carries occasional traffic. Card 31 also carries a gateable unity gain buffer 40 which is connected by a line 41 to the output port 32 of card 30. The buffers 38, 40 and amplifier 33 are controlled by a control bus 42. In normal operation buffer 38 is ON and buffer 40 is OFF so that main traffic is output via port 32 and occasional traffic via output 35, line 37, buffer 38 and line 39. Traffic comes from the transmit MUX along a transmission line to a conventional receive multiplexer MUX which passes the traffic on to the cards 30, 32.

The receive end has to cope with the possibility of failure of either card 10 or card 30. In the case of card 10 failing as has already been described the main traffic will be diverted to input port 16 of card 11 and will accordingly replace the occasional traffic at output port 35 of card 31. Thus this traffic has now to be routed to output port 32 and line 34 of card 30. To do this buffer 38 and driver 33 are turned OFF and buffer 40 enabled so that the traffic is carried via port 35, line 37, buffer 40 and line 41 to output line 34.

Failure of card 30 triggers an identical procedure. Thus detection of failure of card 30 causes the main traffic on line 13 to be routed to the input port 16 of card 11 by appropriate switching of buffers 15, 19. This traffic, now appearing at port 35 of card 31 is routed to output line 34 in the manner described.

In both the transmit and receive ends of the systems the points marked "T" represent termination resistors on the backplane.

It will be appreciated that the dual path system described can be used when there is only main traffic to be transmitted. In such a case the main traffic is branched at the transmit end and is supplied to both ports 12 and 16 and appears at both ports 32 and 35. Should failure of card 10 or 30 be detected there is no need to re-route the traffic at the transmit end and appropriate routing need only take place at the receive end.

The above description has been concerned with a dual path system. The basic principle can however be extended to a transmission system having a greater number of paths.

Figure 2:
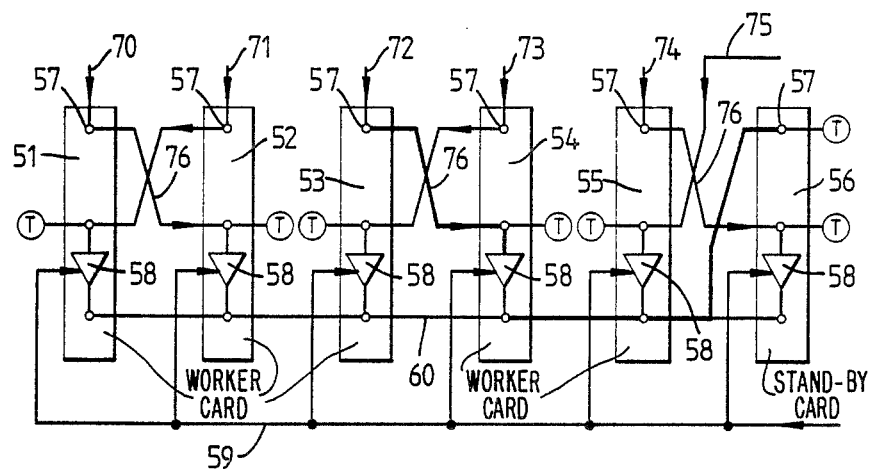
FIG. 2 is a block diagram of the transmit end of a data transmission system having an odd number of main paths and in accordance with the present invention.

FIG. 2 of the drawings shows the transmit end of a system where there are five main worker tributary cards 51 to 55 and a stand-by card 56 which in normal operation handles occasional traffic. As in the embodiment described with regard to FIG. 1 this occasional traffic is lost should any one of cards 51 to 55 fail. Each of the cards 51-56 is identical to those of the transmit end of FIG. 1. Thus each card has an input port 57, and a unity gain gateable buffer 58 controlled by a control bus 59, the output of the buffers being connected to a common line 60 taken to the input port of card 56.

In normal operation main traffic from tributaries is supplied to the input ports of cards 51-55 via respective input lines 70-74 whilst occasional traffic is supplied via line 75 to the buffer 58 of card 55. This buffer is enabled and transmits the traffic to the input port of stand-by card 56 via the common line 60. The remaining buffers 58, under the command of control line 60, are OFF. Each of the input lines 70-74 is branched and is connected via a line 76 to the buffer 58 of an adjacent card so that card 51 has cross-connections with card 52 and card 53 with card 54. Only the occasional traffic line 75 is not branched as it is this channel which is suppressed whenever one of the worker cards 51 to 55 fails.

The procedure followed when one of the worker cards 51-55 fails is similar to that followed when worker card 10 of the embodiment shown in FIGS. 1A, 1B failed. If any of cards 50-55 fails then the buffer 58 of card 55 is turned OFF blocking the passage of the occasional traffic onto the common line 60. Simultaneously the buffer 58 connected by a line 76 to the card which has failed is enabled so that the main traffic to the failed card is re-routed via common line 60 to the input port of stand-by card 56. In FIG. 2 card 53 is shown as having failed and the new route for the traffic that card 53 should have handled, but which is now handled by card 56, is shown in FIG. 2 as a thickened line.

Figure 3:
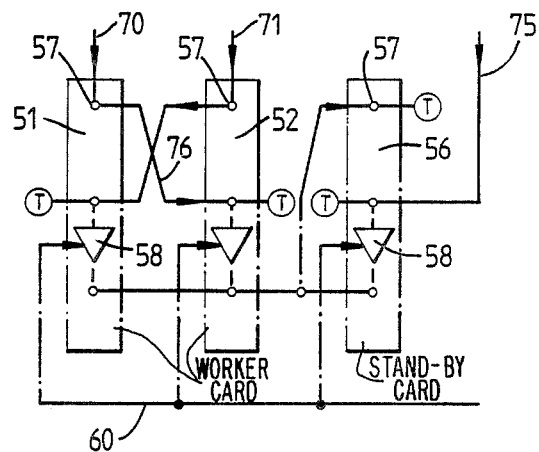
FIG. 3 is a block diagram of part of the transmit end of a data transmission system having an even number of main paths.

The FIG. 3 embodiment had an odd number of worker cards so that it was not possible to pair off all the worker cards. It is for this reason that card 55 is connected to stand-by card 56. This problem does not arise where there is an even number of worker cards as in the embodiment illustrated in FIG. 2. The cards 51, 52 in this FIG. 3 correspond to the similarly numbered cards in FIG. 2. However the occasional traffic input line 75 is connected directly to the buffer 58 of stand-by card 56. In normal operation buffer 58 of card 56 is enabled so that the occasional traffic is routed via common line 60 and a line 76 to the input port 57 of card 56. Should either of cards 51, 52 fail then the buffer 58 of the still functional card is enabled and the buffer of card 56 turned OFF to allow card 56 to take over the functions of the failed card. It will be appreciated that the number of cards can be greater than that shown without affecting the operation of the system. In such a case when one worker card of a pair fails the buffer 58 of the other card of the pair is enabled to feed the input signal to the failed card onto the common line 60.

Figure 4:
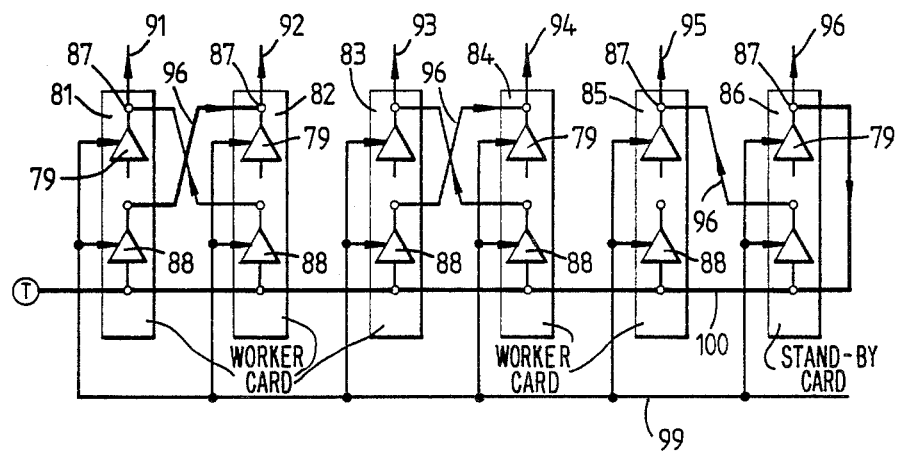
FIG. 4 is a block diagram of the receive end of the system of FIG. 2.

FIG. 4 of the drawings shows the receive end associated with the transmit end shown in FIG. 2.

Five worker tributary cards 81-85 are shown together with a stand-by card 86. These cards are identical to those shown at the receive end in FIGS. 1A, 1B. In normal operation main traffic appears at each of the outputs 91-95 associated with respective cards 81-85 and occasional traffic at output 96. As in the system of FIGS. 1A, 1B the receive end has to be capable of responding to failure of a worker card at the transmit end as well as coping with failure of one of cards 81-85. Should there be a main card failure at the transmit end the main traffic which should have appeared at the appropriate worker receive card will instead be re-routed to stand-by card 86. Thus if card 52 fails (FIG. 2) then the traffic which was intended for card 82 will appear at 86. In order to re-route this traffic to output 92 the buffer 88 of card 81 is enabled. In FIG. 4 it can be seen that each buffer 88 has its output connected by a line 96 to the output of an associated card except for the buffer 88 of card 95. Because in this embodiment, as in FIG. 2, the number of worker cards is odd there is no need for a cross-connection between the impaired worker card 85 and the stand-by card 86. The path of the re-routed main traffic signal normally due to emerge at output port 87 of card 82 is shown in bold lines leading to and from the common line 100.

Should one of worker cards 81 to 85 fail rather than a worker card at the transmit end then the embodiment of FIG. 4 functions in an analagous manner to enable stand-by card 86 take over the sole of the failed card. In FIG. 4 the cards 81 to 87 are identical to those shown at the transmit end of FIG. 1 and include output driver amplifiers 79, output ports 81 and buffers 88. The stand-by card is card 86. The traffic due to be handled by the failed worker card is re-routed to stand-by card 86 and the buffer 88 of the worker card associated with the failed card is enabled to allow the traffic to emerge at the correct output.

Figure 5:
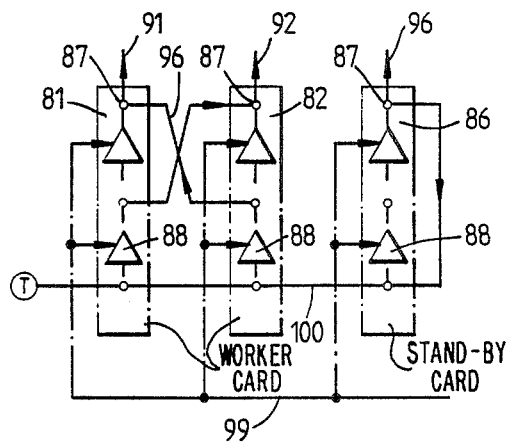
FIG. 5 is a block diagram of part of the receive end associated with the system of FIG. 3.

FIG. 5 of the accompanying drawings shows the corresponding receive end with an even number of worker cards. As in the FIG. 3 embodiment the even number of worker cards means that every worker card has a corresponding pair with the buffers 88 and output ports 87 cross linked by lines 96. Should a worker card fail the buffer 88 of its associated card is enabled so that the potentially lost traffic, now appearing as common line 100 can be supplied via the newly enabled buffer to the right output line.

I claim:

1. A data transmission system for sending data streams from a transmit end to a receive end, comprising:
   (a) at the transmit end, a worker tributary card having an input port for receiving main traffic data streams for conveyance along the system during normal operation;

(b) at the transmit end, a stand-by tributary card having an input port for receiving occasional traffic data streams for conveyance along the system during normal operation;

(c) means at the transmit end for interconnecting the input ports of the worker and the stand-by cards; and (d) control means operatively connected to the interconnecting means, for electrically isolating the input ports of the worker and the stand-by cards during normal operation to enable both the main traffic and the occasional data streams to be conveyed along the system, and for electrically interconnecting the input ports of the worker and the stand-by cards during malfunction of the worker card to enable the main traffic data streams to be conveyed to the input port of the stand-by card for further conveyance along the system, whereby the stand-by card replaces the malfunctioning worker card to provide path protection for the system.

2. The data transmission system according to claim 1, wherein a plurality of worker tributary cards identical to said first-mentioned worker card are provided at the transmit end; and wherein the interconnecting means interconnects the input ports of all the worker cards and of the stand-by card; and wherein the control means isolates the input ports of all the worker cards and of the stand-by card during normal operation, and interconnects only the input port of the malfunctioning worker card with the input port of the stand-by card during said malfunction.

3. The data transmission system according to claim 1, wherein the control means includes a control member actuatable by a control bus between a blocking state during normal operation, and a conducting state during said malfunction, said control member being mounted on the stand-by card.

4. The data transmission system according to claim 2, wherein the worker cards are arranged in at least one pair.

5. The data transmission system according to claim 2, wherein there are provided an even number of worker cards.

6. The data transmission system according to claim 2, wherein there are provided an odd number of worker cards.

7. The data transmission system according to claim 1; and further comprising, at the receive end, a worker tributary receive card having an input port for receiving main traffic data streams from the worker card at the transmit end during normal operation; at the receive end, a stand-by tributary receive card having an input port for receiving occasional traffic data streams from the stand-by card at the transmit end during normal operation; means, at the receive end, for interconnecting the input ports of the worker and the stand-by receive cards; and control means operatively connected to the interconnecting means at the receive end, for electrically isolating the input ports of the worker and the stand-by receive cards during normal operation to enable both the main traffic and the occasional data streams to be received, and for electrically interconnecting the input ports of the worker and the stand-by receive cards during malfunction of the worker receive card to enable the main traffic data streams to be received by the input port of the stand-by receive card, whereby the stand-by receive card replaces the malfunctioning worker receive card to provide path protection for the system.

* * * * *